(12) United States Patent
Iida

(10) Patent No.: US 6,335,382 B1
(45) Date of Patent: Jan. 1, 2002

(54) ULTRAVIOLET-CURABLE ADHESIVE FOR BONDING OPTICAL DISKS

(75) Inventor: Takafumi Iida, Tatsuno (JP)

(73) Assignee: Nagase-Ciba Ltd., Osaka (JP)

( * ) Notice: Subject to any disclaimer, the term of this patent is extended or adjusted under 35 U.S.C. 154(b) by 0 days.

(21) Appl. No.: 09/462,276
(22) PCT Filed: Feb. 15, 1999
(86) PCT No.: PCT/JP99/00654
§ 371 Date: Jan. 6, 2000
§ 102(e) Date: Jan. 6, 2000

(30) Foreign Application Priority Data

May 8, 1998 (JP) .......................................... 10-125836

(51) Int. Cl.$^7$ ................................................. C08F 2/50
(52) U.S. Cl. ........................ 522/93; 522/90; 522/96; 522/138; 522/116; 522/12; 522/14; 522/17; 522/30; 522/33; 522/40; 522/41; 522/42; 522/43; 522/44; 522/45; 522/46; 522/47; 522/65
(58) Field of Search ....................... 522/12, 11, 30, 522/33, 40, 41, 42, 43, 44, 46, 47, 65, 96, 90, 93, 138, 116, 126; 526/301

(56) References Cited

U.S. PATENT DOCUMENTS

| | | | |
|---|---|---|---|
| 4,557,813 A | * 12/1985 | Heil et al. ............. | 204/159.14 |
| 4,559,118 A | * 12/1985 | Heil et al. ............. | 204/159.14 |
| 4,954,591 A | * 9/1990 | Belmares ................ | 526/264 |
| 5,426,166 A | * 6/1995 | Usifer et al. ............ | 526/301 |
| 5,484,864 A | * 1/1996 | Usifer et al. ............ | 526/301 |
| 5,624,759 A | * 4/1997 | Usifer et al. ............ | 428/424.2 |
| 5,698,285 A |  12/1997 | Kojima ................. | 428/65.2 |
| 6,017,603 A | * 1/2000 | Tokuda et al. ........... | 428/64 |

FOREIGN PATENT DOCUMENTS

| | | |
|---|---|---|
| EP | 0 706 178 A2 | 4/1996 |
| EP | 0 768 353 A1 | 4/1997 |
| EP | 0 889 465 A2 | 1/1999 |
| JP | 10-46109 | 2/1998 |

OTHER PUBLICATIONS

Kloosterboer, J.G. et al., "Photopolymerizable lacquers for LaserVision video discs", *Philips tech., Rev.*, vol. 40, No. 10, 1982, pp. 298–309.

* cited by examiner

Primary Examiner—James J. Seidleck
Assistant Examiner—Sanza L McClendon
(74) Attorney, Agent, or Firm—Armstrong, Westerman, Hattori, McLeland & Naughton, LLP

(57) ABSTRACT

An ultraviolet-curable adhesive having an excellent moisture resistance and suitable for bonding optical disks having an information recording layer (vapor deposition layer), particularly optical disks having a thick vapor deposition layer, which contains, as essential components, (A) N-vinylpyrrolidone, (B) a urethane (meth)acrylate oligomer derived from a caprolactone-based polyol, an alicyclic diisocyanate and (meth)acrylic acid, and (C) a photopolymerization initiator containing (C-1) a photopolymerization initiator composed of only a carbon atom, a hydrogen atom and an oxygen atom without containing a nitrogen atom, a sulfur atom and a phosphorus atom and (C-2) a photopolymerization initiator containing a nitrogen atom and/or a sulfur atom in a (C-1)/(C-2) ratio of 70/30 to 100/0 by weight.

15 Claims, 1 Drawing Sheet

ULTRAVIOLET-CURABLE ADHESIVE FOR BONDING OPTICAL DISKS

TECHNICAL FIELD

The present invention relates to an ultraviolet-curable adhesive for bonding optical disks, and more particularly to an ultraviolet-curable adhesive composition which is used in producing information recording media by applying it to an information recording layer of an optical disk having the information recording layer on one surface and bonding thereon another optical disk which may have an information recording layer.

BACKGROUND ART

Production of optical disks (hereinafter referred also to as "DVD") used as an information recording medium has been made in such a manner as applying an adhesive to an information recording layer of an optical disk having the information recording layer on one surface and laminating onto the information recording layer another optical disk which may have an information recording layer and curing the adhesive.

Ultraviolet-curable adhesives are suitable for use in this method from the viewpoints of simplification of DVD production steps, no occurrence of warping of disks owing to heating of the disks. In that case, it is required for curing the adhesive that ultraviolet rays irradiated from the outside to disks having an information recording layer and a protective layer and laminated with the adhesive pass through the substrate, the information recording layer, the protective layer and the like. For this reason, it was recognized difficult to make ultraviolet rays reach the adhesive to cure it. Thus, it was popular to use hot melt adhesives or thermosetting adhesives.

However, hot melt adhesives have the problem that the adhesives are easy to melt again if heat is applied to DVD using them, so the mechanical strength cannot be retained at high temperatures. Also, in case of producing DVD by using thermosetting adhesives, problems such as warping, deformation and the like owing to heating arise.

Thereafter, as a result of investigation in every direction about the use of ultraviolet-curable adhesive, there are proposed ultraviolet-curable adhesives which can be cured even by a slight amount of ultraviolet rays reached passing through the substrate, information recording layer, protective layer and the like. For example, known are an ultraviolet-curable adhesive of radical polymerization type which contains a (meth)acrylic monomer or oligomer as a main component and a photopolymerization initiator such as a benzoyl alkyl ether compound, a benzophenone compound or a thioxanthone compound, an ultraviolet-curable adhesive of polyene-polythiol addition polymerization curing type, and an ultraviolet-curable adhesive of cationic polymerization type comprising an epoxy resin and a Lewis acid type photopolymerization initiator (Japanese Patent Publication Kokai No. 8-161771).

However, since a thin film of a metal such as aluminum is used in the information recording layer and is easy to be attacked by a cationic polymerization type adhesive, ultraviolet-curable (meth)acrylic adhesives of radical polymerization type are popularly used at present.

Most of photopolymerization initiators to be used in the ultraviolet-curable (meth)acrylic adhesives have an absorption also in a high wavelength region. In general, initiators having an absorption at a wavelength of 360 nm or more and whose molar extinction coefficient in that wavelength region is as large as possible are used (Japanese Patent Publication Kokai No. 9-31416, No. 9-35335, No. 9-169956 and No. 10-8018).

However, if an optical disk wherein the adhesion is performed by the ultraviolet-curable (meth)acrylic adhesive of radical polymerization type is allowed to stand in a high humidity atmosphere, there arises a problem that moisture is easy to be adsorbed by the adhesive layer and the adsorbed moisture stays at the interface between the adhesive layer and the disk, and also a component in the adhesive migrates, so these adversely affect the adjacent information recording layer to remarkably lower the recording performance. A translucent film (vapor deposition film) of Al, Au, SiN, SiC, Si or the like is generally used as the information recording layer. The thickness of the film is usually from 50 to 300 angstroms. In case of aluminum deposition film, the thickness is from 400 to 1,000 angstroms. If the translucent films become thick, the bad influence of moisture on the recording performance of these translucent films particularly increase. Also, since a component itself of the photopolymerization initiator may corrode the metal thin film depending on the kind of the initiator, the bad influence on the information recording layer further increases in that case.

An object of the present invention is to provide an ultraviolet-curable adhesive which is hard to cause staying of moisture in the interface between the adhesive layer and the information recording layer even in the case that a relatively thick translucent film is used, thus scarcely exerting a bad influence on the information recording layer, and which does not cause separation of the laminated disks.

DISCLOSURE OF INVENTION

In general, an adhesive using a nitrogen atom-containing monofunctional monomer such as N-vinylpyrrolidone has a high water absorption and is easy to introduce a problem in various uses. For such a reason, in general N-vinylpyrrolidone has not been used for applications requiring a moisture resistance.

The present inventor has found that an ultraviolet-curable composition containing N-vinylpyrrolidone which is a nitrogen atom-containing monofunctional monomer, and a specific urethane (meth)acrylate oligomer as essential components has, contrary to expectations, a good moisture resistance and is useful as an adhesive for bonding optical disks which requires a moisture resistance, and exhibits excellent characteristics as compared with conventional adhesives.

Thus, in accordance with the present invention, there is provided an ultraviolet-curable adhesive for bonding optical disks, which is characterized in containing:

(A) N-vinylpyrrolidone, (B) a urethane (meth)acrylate oligomer derived from a caprolactone-based polyol, an alicyclic diisocyanate and (meth)acrylic acid, and (C) a photopolymerization initiator containing (C-1) a photopolymerization initiator composed of only a carbon atom, a hydrogen atom and an oxygen atom without containing a nitrogen atom, a sulfur atom and a phosphorus atom and (C-2) a photopolymerization initiator containing a nitrogen atom and/or a sulfur atom in a (C-1)/(C-2) ratio of 70/30 to 100/0 by weight.

The photopolymerization initiator (C) may be composed of only the component (C-1) or may be a combination of the components (C-1) and (C-2).

The adhesive of the present invention may further contain (D) 5 to 100 parts by weight of an alicyclic mono(meth)

acrylate and/or (E) 5 to 95 parts by weight of a bisphenol type di(meth)acrylate per 100 parts by weight of the total of the components (A) and (B), provided that the amount of the component (E) does not exceed the amount of the component (B).

The adhesive of the present invention satisfies such characteristics required for adhesives for bonding optical disks that it has an adequate softness, structural destruction of a cured resin does not occur even if subjected to a moisture resistance test, the adhesion property to disk materials is not lowered, and the performances of a metal film are not lowered. Also, since the adhesive contains N-vinylpyrrolidone and a specific urethane (meth)acrylate oligomer as the constituent components, the adhesive layer has a high water retainability and accordingly is hard to cause problems such as staying of the absorbed moisture in the interface between the information recording layer and the adhesive layer and deterioration of the adhesion property, thus exhibiting an excellent moisture resistance.

BEST MODE FOR CARRYING OUT THE INVENTION

Figure 1:
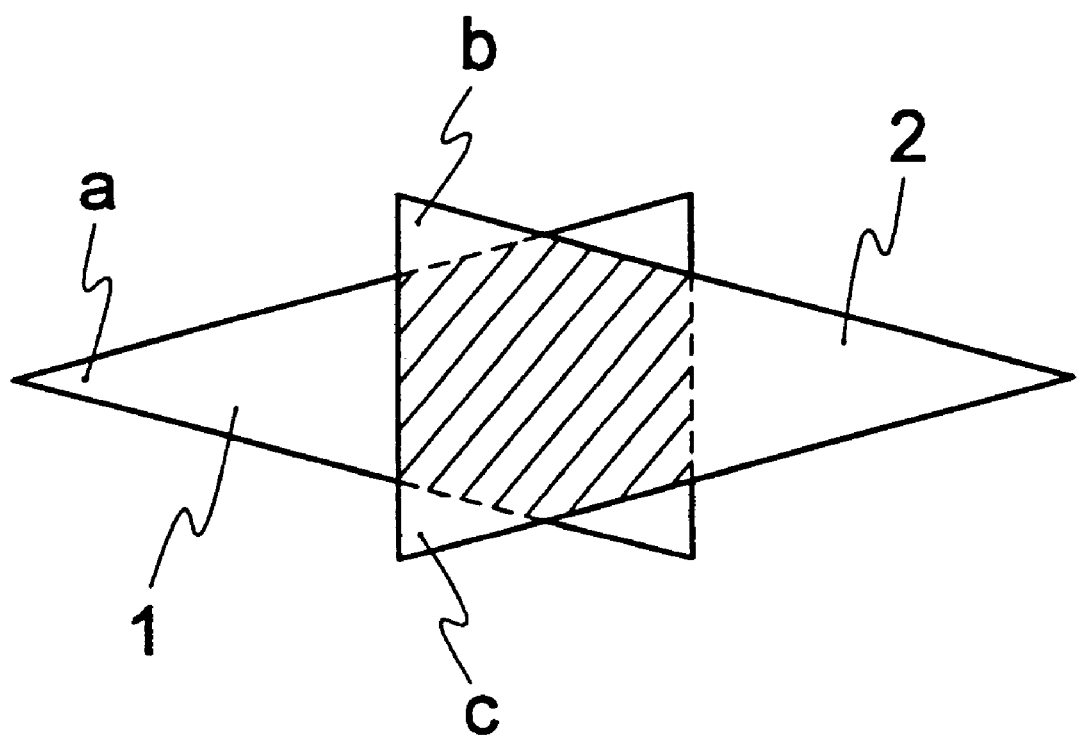
FIG. 1 is a plan view of a specimen wherein disk 1 and disk 2 are bonded with an adhesive and which is used when evaluating the water resistance of an ultraviolet-curable adhesive and the corrosion resistance of the information recording layer.

The ultraviolet (UV)-curable adhesive of the present invention suitable for use in bonding optical disks contains N-vinylpyrrolidone (A), urethane (meth)acrylate oligomer (B) derived from a caprolactone-based polyol, an alicyclic diisocyanate and (meth)acrylic acid, and a photopolymerization initiator (C) for the components (A) and (B). The N-vinylpyrrolidone (A) provides a water retainability to the cured adhesive layer. Since the moisture absorbed in the adhesive layer is stably trapped by the adhesive layer and accordingly is hard to stay in the interface between the adhesive layer and the information recording layer, the N-vinylpyrrolidone (A) serves to reduce a bad influence of moisture on the adjacent information recording layer.

The N-vinylpyrrolidone (A) is polymerizable by light irradiation and serves to raise the reactivity of the polymerization system containing the component (B), since it has one highly reactive C=C bond, in addition to having particularly good hydrophilic property and water retaining property among nitrogen atom-containing monofunctional monomers and also having a high adhesion property. Also, since it is a monofunctional monomer and has a low molecular weight, the viscosity of the obtained adhesive can be lowered.

As mentioned above, the urethane (meth)acrylate oligomer (B) is a compound derived from a caprolactone-based polyol, an alicyclic diisocyanate and (meth)acrylic acid, and provides a softness to the adhesive layer.

Preferably, the molecular weight of the urethane (meth) acrylate oligomer (B) is from 700 to 5,500, especially from 1,000 to 5,000, from the viewpoints of mechanical properties, polymerizability, viscosity and the like. If the molecular weight is too small, the moisture resistance of the adhesive tends to lower or the mechanical properties of the adhesive layer tend to lower. If the molecular weight is too large, there is a tendency that the viscosity of the adhesive raises, crystallization occurs or the polymerizability lowers.

As the caprolactone-based polyol of the raw materials of the oligomer (B) are used those having a molecular weight of 250 to 4,000 and a functionality of 1 to 4. Examples of the polyol are, for instance, reaction products of a caprolactone with an alcohol having an aliphatic, aromatic or heterocyclic group such as butanol, ethylene glycol, 1,4-butanediol, 1,6-hexanediol, neopentyl glycol, trimethylolpropane, diethylene glycol, 1,4-dimethylolcyclohexane, bisphenol A polyethoxydiol having a molecular weight of 300 to 1,500 or polytetramethylene glycol having a molecular weight of 500 to 1,500. These may be used alone or in admixture thereof. Of these, caprolactone-based diols or triols having a molecular weight of 250 to 3,000 are preferred from the viewpoints of good balance of moisture resistance, heat resistance and softness and easiness in synthesis. Examples of the caprolactone-based diols are, for instance, e-caprolactone-based diols of the formula:

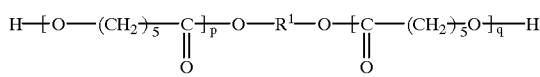

wherein p and q are independently from 1 to 5, and $R_1$ is a bivalent group that hydroxyl groups are removed from dihydric alcohols among the above-mentioned alcohols. Examples of the caprolactone-based triol are, for instance, e-caprolactone-based triols of the formula:

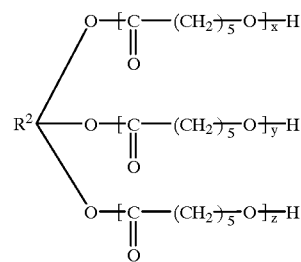

wherein x, y and z are independently from 1 to 5, and $R_2$ is a trivalent group that hydroxyl groups are removed from trihydric alcohols among the above-mentioned alcohols. Examples of the commercially available caprolactone-based polyol are, for instance, Placcel 205, Placcel 220, Placcel 240, Placcel 303, Placcel 308, Placcel 405, Placcel 410 (which are products of DAICEL CHEMICAL INDUSTRIES, LTD.), TONE® Polyol 0210, TONE® Polyol 0240, TONE® Polyol 0301, TONE® Polyol 0310 (which are products of UNION CARBIDE JAPAN K.K.), and the like.

Examples of the alicyclic diisocyanate used as a raw material for the component (B) are, for instance, 4,4'-dicyclohexylmethane diisocyanate, isophorone diisocyanate, dicyclopentanyl diisocyanate, and the like. Since the alicyclic diisocyanate is used, the obtained cured product of the adhesive has a good weatherability. Of these, isophorone diisocyanate is preferably used, since the balance between the moisture resistance and the weatherability is particularly good.

Further, (meth)acrylic acid is used as a raw material for the component (B). It imparts a photopolymerizability to the component (B).

Since the polyol used as a raw material of the component (B) is a caprolactone-based polyol, oligomers excellent in moisture resistance, weatherability and the like are obtained as compared with other polyols, e.g., polyether polyols and polyester polyols excepting the caprolactone-based polyols. Also, since a carprolactone-based polyol is combined with the caprolactone-based polyo or (meth)acrylic acid through an alicyclic diisocyanate, the weatherability and heat resistance are further increased as compared with the use of aromatic diisocyanates and linear aliphatic diisocyanates.

Commercially available urethane (meth)acrylate polymers can be used as the component (B). Preferable examples thereof are, for instance, KAYARAD UX-4101 (made by NIPPON KAYAKU CO., LTD.), U-180A (made by SHIN-NAKAMURA CHEMICAL CO., LTD.), KMR 7595, KMR 7610 and KMR 7619 (which are products of DAICEL CHEMICAL INDUSTRIES, LTD.), and the like. These may be used alone or in admixture thereof. Of these, KMR 7595, KMR 7610 and KMR 7619 are preferred from the viewpoints of good moisture resistance and good balance between the moisture resistance and the heat resistance.

In addition to the components (A) and (B), the photopolymerization initiator (C) for polymerizing them are incorporated into the adhesive of the present invention. As the photopolymerization initiator (C), a photopolymerization initiator (C-1) composed of only a carbon atom, a hydrogen atom and an oxygen atom without containing a nitrogen atom, a sulfur atom and a phosphorus atom is used alone or in combination with a photopolymerization initiator (C-2) containing a nitrogen atom and/or a sulfur atom.

The photopolymerization initiator (C-1) has the advantages that failure caused by moisture, e.g., corrosion of the information recording layer, is hard to occur in the moisture resistance test, a high adhesion property is obtained, balance between the surface curability of the adhesive layer and the deep curability (curability of the adhesive layer in the vicinity of the interface between the adhesive layer and a substrate located on the side opposite to the ultraviolet irradiation side with respect to the adhesive layer) is good, and a stable adhesive which does not start the polymerization even if allowed to stand under irradiation of a fluorescent light.

Examples of the photopolymerization initiator (C-1) are, for instance, 1-hydroxycyclohexyl phenyl ketone, 2-hydroxy-2-methyl-1-phenylpropanone, 2,2-dimethoxy-2-phenylacetophenone, benzophenone, benzoin isobutyl ether, benzoin n-butyl ether, 2,2-dimethoxy-1,2-diphenylethane-1-one, methylphenyl glyoxylate, benzyl dimethyl ketal, and the like. These may be used alone or in admixture thereof. Of these, 1-hydroxycyclohexyl phenyl ketone and 2-hydroxy-2-methyl-1-phenylpropanone are preferred from the viewpoints of good deep curability and adhesion property.

On the other hand, the photopolymerization initiator (C-2) containing nitrogen atom and/or sulfur atom exhibits a good curability with a relatively small amount of transmitted light. Preferred are those which have a large absorption on the high wavelength side of not less than 360 nm and that an overlap of the wavelength of transmitted light and the absorption wavelength is large, since a particularly excellent curability is exhibited.

Examples of the photopolymerization initiator (C-2) are, for instance, Michler's ketone, 2,4-diethylthioxanthone, 2,4-diisopropyl-thioxanthone, 2-isopropylthioxanthone, 2-chlorothioxanthone, 2-benzyl-2-dimethylamino-1-(4-morpholinophenyl)-butanone-1,3,6-bis(2-methyl-2-morpholinopropanonyl)-9-butyl-carbazole, isoacryl-4-(dimethylamino)benzoate, ethyl-4-(dimethylamino) benzoate, [4-(4-methylphenylthio)phenyl] phenylmethanone, 2-methyl-1-[4-(methyl-thio)phenyl]-2-morpholino-propane-1-one, and the like. These may be used alone or in admixture thereof. Of these, 2-methyl-1-[4-(methyl-thio)phenyl]-2-morpholino-propane-1-one is particularly preferable from the viewpoint of moisture resistance and corrosion resistance.

In the adhesive of the present invention, the component (C-1) may be incorporated alone or may be incorporated together with the component (C-2). In case of the combination use of the components (C-1) and (C-2), it is possible to obtain a more excellent adhesive having both an excellent moisture resistance produced by the component (C-1) and an excellent curability under a slight transmitted light produced by the component (C-2). From the viewpoint of capable of sufficiently exhibiting the effects of both initiators, it is preferable that the (C-1)/(C-2) ratio is from 99/1 to 70/30 by weight, especially from 98/2 to 90/10 by weight.

With respect to the contents of the respective components included in the adhesive of the present invention comprising the components (A) to (C), preferably the amount of the component (A) is from 5 to 60% by weight, especially from 10 to 50% by weight, more especially from 20 to 50% by weight, based on the total of the components (A) and (B). If the amount of the component (A) is less than 5% by weight, the moisture resistance which is a primary object of the present invention is not sufficiently exhibited. Even if the component (A) is used in an amount exceeding 60% by weight, further effect based on the increase in amount is not expected. Rather, the viscosity of the adhesive tends to be excessively lowered in addition to lowering of the softness of the adhesive, since the content of the component (B) decreases.

The amount of the photopolymerization initiator (C) is preferably from 1 to 20% by weight, more preferably from 3 to 15% by weight, based on the total amount of the polymerizable components (component (A) and component (B)). If the amount of the component (C) is less than 1% by weight, the surface of the cured product tends to become sticky owing to decrease in curability. If the amount is more than 20% by weight, there is a tendency that the component (C) is easy to be recrystallized or redeposited or the moisture resistance is deteriorated because the component (C) is easy to migrate into the information recording layer after the curing.

The adhesive of the present invention containing the components (A) to (C) as mentioned above may be incorporated with at least one of an alicyclic mono(meth)acrylate (component (D)), in order to reduce the viscosity of the adhesive or to improve the adhesion property with a substrate made by polycarbonate or the like and the moisture resistance, and a bisphenol di(meth)acrylate (component (E)), in order to impart a rigidity to the adhesive so as to raise the strength of the adhesive layer in addition to imparting a some degree of moisture resistance.

In case of incorporating the adhesive containing the components (A) to (C) (hereinafter also referred to as "adhesive (I)") with an additional polymerizable component such as component (D) or component (E), it is preferable to supplement the component (C) so that the proportion of the photopolymerization initiator (C) is from 1 to 20% by weight, especially from 3 to 15% by weight, based on the total amount of the polymerizable components.

The component (D) has one (meth)acryloyl group, and are monomers having a group for example:

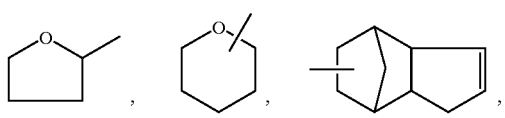

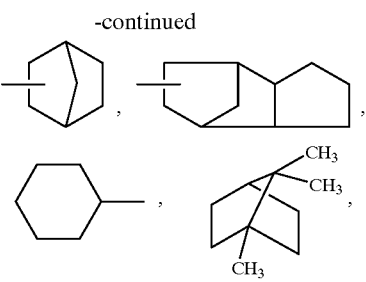

Since it has a relatively low molecular weight and a relatively low viscosity, the viscosity of the adhesive can be reduced. In addition, since it is an alicyclic compound, the adhesion property can be further increased as compared with mono(meth)acrylate compounds having an aromatic or linear aliphatic group.

Examples of the alicyclic mono(meth)acrylate (D) are, for instance, tetrahydrofurfuryl mono(meth)acrylate, cyclohexyl (meth)acrylate, dicyclopentenyl(meth)acrylate, isobornyl(meth)acrylate, norbornyl(meth)acrylate, dicyclopentanyl(meth)acrylate, adamantyl (meth)acrylate, tricyclodecane(meth)acrylate, hexacyclo-[6,6,1,1$^{3.6}$,1$^{10.13}$, 0$^{2.7}$,0$^{9.14}$]heptadecyl-4-acrylate, 12-methylhexacyclo-[6,6, 1,1$^{3.6}$,1$^{10.13}$,0$^{2.7}$,0$^{9.14}$]heptadecyl-4-acrylate, octacyclo-[8,8, 0,1$^{2.9}$,1$^{4.7}$,1$^{11.18}$,1$^{13.16}$,0$^{3.8}$,0$^{12.17}$]docosyl-5-acrylate, 15-methyl-octacyclo[8,8,0,1$^{2.9}$,1$^{4.7}$,1$^{11.18}$,1$^{13.16}$,0$^{3.8}$,0$^{12.17}$] docosyl-5-acrylate, tetra-cyclo[4,4,0,1$^{2.5}$,1$^{7.10}$]dodecyl-3-acrylate, 2,7-dimethyltetracyclo-[4,4,0,1$^{2.5}$,1$^{7.10}$]dodecyl-3-acrylate, 9-stearyltetracyclo-[4,4,0,1$^{2.5}$,1$^{7.10}$]dodecyl-3-acrylate, and the like. Of these, tetrahydrofurfuryl mono (meth)acrylate, cyclohexyl (meth)acrylate and dicyclopentenyl (meth)acryalte are preferred from the viewpoints that the dilution property is good and the cured products become tough.

In case of adding the component (D) to the adhesive (I), it is preferable that the amount of the component (D) is from 5 to 100 parts by weight, especially from 10 to 80 parts by weight, based on 100 parts by weight of the total of the components (A) and (B). If the amount of the component (D) is too small, the effect produced by the use of the component (D) is not sufficiently obtained. If the amount is too large, there is a tendency that the heat resistance is lowered and the viscosity becomes too low.

Examples of the bisphenol di(meth)acrylate (E) are, for instance, di(meth)acrylates produced from bisphenol compounds such as bisphenol A, bisphenol AD, bisphenol F and bisphenol S (component (E-1)), di(meth)acrylates produced from known bisphenol type epoxy resins derived from bisphenol compounds (component (E-2)), and oligomers of these monomeric compounds.

Examples of the commercially available component (E-1) are, for instance, NEW FRONTIEW BPE-4 and NEW FRONTIEW BPE-10 (which are products of DAI-ICHI KOGYO SEIYAKU CO., LTD.), EBECRYL 150 (which is a product of DAICEL-UCB COMPANY LTD.), and KAL-YARAD R-551 (which is a product of NIPPON KAYAKU CO., LTD.). Examples of the commercially available component (E-2) are, for instance, SP1509, SP1506 and SP1507 (which are products of Showa Kobunshi Kabushiki Kaisha), and EBECRYL 3700, EBECRYL 3720 and EBECRYL 600 (which are products of DAICEL-UCB COMPANY LTD.). These may be used alone or in admixture thereof. Of these, EBECRYL 150 and EBECRYL 3700 are preferred from the viewpoints of high moisture resistance and good heat stability.

In case of adding the component (E) to the adhesive (I), it is preferable that the amount of the component (E) is from 5 to 95 parts by weight, especially from 5 to 50 parts by weight, based on 100 parts by weight of the total of the components (A) and (B). If the amount of the component (D) is too small, the effect produced by the use of the component (D) is not sufficiently obtained. If the amount is too large, there is a tendency that the viscosity becomes high, so the adhesive layer becomes hard and the adhesive strength is lowered. In particular, when the component (E-2) is used, the adhesive is apt to have a high viscosity and, therefore, it is preferable to select the amount within the range of 5 to 30 parts by weight. Also, in order to prevent the disk performances (e.g. falling ball impact resistance) from lowering, it is preferable that the amount of the component (E) does not exceed the amount of the component (B).

When both the component (D) and the component (E) are incorporated into the adhesive (I), there can be obtained a more excellent adhesive having well balanced workability (viscosity), mechanical properties, heat resistance and the like based on the effects of both components. In this case, the amount of the component (D) is from 5 to 100 parts by weight, especially 10 to 80 parts by weight, per 100 parts by weight of the total of the components (A) and (B), and the amount of the component (E) is from 5 to 95 parts by weight, especially 10 to 80 parts by weight, per 100 parts by weight of the total of the components (A) and (B), provided that it is preferable that the total amount of the components (D) and (E) is from 10 to 150 parts by weight, especially from 10 to 130 parts by weight, per 100 parts by weight of the total of the components (A) and (B), since the water resistance and the adhesion property are easy to be lowered if the total amount of the components (D) and (E) becomes too large with respect to the total amount of the components (A) and (B). Also, it is preferable that the amount of the component (E) does not exceed the amount of the component (B).

Preferable examples of the formulations (wherein the total amount of the components (A) and (B) is 100 parts by weight) for the adhesive of the present invention are, for instance, in case of the adhesive (I), compositions containing (A) 20 to 50 parts by weight of N-vinylpyrrolidone, (B) 80 to 50 parts by weight of KRM7595, and (C) 1 to 20% by weight of 1-hydroxycyclohexyl phenyl ketone based on the total amount of the components (A) and (B). In case of the adhesive incorporated with the alicyclic mono(meth) acrylate (D), preferable examples are, for instance, compositions containing (A) 5 to 60 parts by weight of N-vinylpyrrolidone, (B) 40 to 95 parts by weight of KRM7595, (D) 10 to 80 parts by weight of tetrahydrofurfuryl acrylate based on 100 parts by weight of the total of the components (A) and (B), and (C) 1 to 20% by weight of 1-hydroxycyclohexyl phenyl ketone based on the total amount of the components (A), (B) and (D). In case of the adhesive incorporated with the bisphenol di(meth)acrylate (E), preferable examples are, for instance, compositions containing (A) 5 to 60 parts by weight of N-vinylpyrrolidone, (B) 40 to 95 parts by weight of KRM7595, (E) 5 to 50 parts by weight of EBECRYL 150 based on 100 parts by weight of the total of the components (A) and (B), and (C) 1 to 20% by weight of 1-hydroxycyclohexyl phenyl ketone based on the total amount of the components (A), (B) and (E). Also, in case of the adhesive incorporated with the components (D) and (E), preferable examples are, for instance, compositions containing (A) 5 to 60 parts by weight of N-vinylpyrrolidone, (B) 40 to 95 parts by weight of KRM7595, and based on 100 parts by weight of the total of the components (A) and (B), (D) 10 to 80 parts by weight of tetrahydrofurfuryl acrylate and (E) 10 to 80 parts by weight of EBECRYL 150, and (C) 1 to 20% by weight of 1-hydroxycyclohexyl phenyl ketone based on the total amount of the components (A), (B), (D) and (E).

The adhesive of the present invention may further contain other known polymerizable monomers such as monofunctional (meth)acryates, polyfunctional (meth)acrylates, vinyl acetate and (meth)acrylic acid, or other known polymerizable oligomers, so long as the features of the present invention are not impaired. In this case, it is preferable to supplement the photopolymerization initiator (C) so that the proportion of the component (C) is from 1 to 20% by weight based on the total of the polymerizable components.

Examples of the monofunctional (meth)acrylate are, for instance, (meth)acrylates having, as a substituent group, a group such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, nonylphenoxyethyl, glycidyl, 2-hydroxyethyl, 2-hydroxypropyl, 3-chloro-2-hydroxypropyl, dimethylaminoethyl, diethylaminoethyl, nonylphenoxyethyltetrahydrofurfuryl, caprolactone-modified tetrahydrofurfuryl or dicyclopentenyloxyethyl.

Examples of the polyfunctional (meth)acrylate are, for instance, a di(meth)acrylate of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricylodecanedimethanol, ethylene glycol, polyethylene glycol, propylene glycol or polypropylene glycol, a di(meth)acrlate of tris(2-hydroxyethyl) isocyanurate, a di(meth)acrylate of a diol obtained by addition of 4 moles or more of ethylene oxide or propylene oxide to 1 mole of neopenyl glycol, a di(meth)acrylate or tri(meth) acrylate of a triol obtained by addition of 3 moles or more of ethylene oxide or propylene oxide to 1 mole of trimethylolpropane, tris(2-hydroxyethyl)isocyanurate tri (meth)acrylate, trimethylolpropane tri(meth)acrylate, pentaerythritol tri(meth)acrylate, dipentaerythritol poly(meth) acrylate, a poly(meth)acrylate of caprolactone-modified tris [(meth)acryloyloxyethyl]isocyanurate or alkyl-modified dipentaerythritol, a poly(meth)acrylate of caprolactone-modified dipentaerythritol, hydroxypivalic neopentyl glycol, ethylene oxide-modified phosphoryl (meth)acrylate, ethylene oxide-modified alkylphosphoryl (meth)acryalte, and the like.

Examples of the polymerizable oligomer are oligomers of polyester (meth)acrylates other than the above-mentioned, polyether (meth)acrylate, epoxy (meth)acrylate or urethane (meth)acryalte, and the like.

The polymerizable monomer is effective for reducing the viscosity of the adhesive. The polymerizable oligomer is effective for adjusting the modulus of elasticity of the adhesive layer. The monofunctional (meth)acrylate is effective for increasing the adhesion property of the adhesive. The polyfunctional (meth)acrylate is effective for improving the strength of the adhesive.

These components should be used so as not to impair the features of the present invention, that is, in an amount of at most 20% by weight, especially at most 10% by weight, based on the total amount of all polymerizable compounds.

The adhesive of the present invention may contain, as occasion demands, various assistants and additives, e.g., silane coupling agent, polymerization inhibitor, levelling agent, surface lubricating agent, defoaming agent, light stabilizer, antioxidant, antistatic agent, filler and organic solvent.

Respective adhesives according to the present invention can be obtained by uniformly mixing the components. Uniform mixing can be achieved generally by stirring the components in a mixer or a kneader at a temperature of 40 to 80° C. under a reduced pressure (5 to 30 mmHg).

The adhesive of the present invention is specifically explained by means of examples, wherein all parts and % are by weight unless otherwise noted. It is to be understood that the present invention is not limited to these examples.

Examples 1 to 7 and Comparative Examples 1 to 7

The components shown in Tables 1 and 2 were mixed according to the recipes shown in Tables 1 and 2 at 60° under a reduced pressure of 10 mmHg for 0.5 hour by a mixer to give a uniform ultraviolet curable adhesive.

The water resistance of the obtained adhesive and the corrosion resistance of the information recording layer were evaluated by the following methods. The results are shown in Tables 1 and 2.

(Water resistance)
1. Moisture staying property

An optical disk having a diameter of 120 mm and a thickness of 0.6 mm was radially cut into 16 equal parts and washed with isopropyl alcohol. As shown in FIG. 1, the defatted disk part 1 was coated with the prepared ultraviolet curable adhesive so that the thickness of the adhesive layer became about 10 $\mu$m, and another defatted disk part 2 was superposed thereon with the information recording layers facing each other so as not to introduce bubbles to the oblique line portion in FIG. 1. The adhesive was cured by UV irradiation from a metal halide lamp (made by JAPAN STORAGE BATTERY CO., LTD.) under a condition of 500 mJ/cm$^2$. After the curing, the test specimens were boiled for 1 hour under atmospheric pressure, and they were taken out and allowed to stand at room temperature (25° C.). With respect to each test specimen, generation of marks of water drops (polka dots) was observed every hour up to the eighth hour. The evaluation was made according to the following criteria.

◯: No mark of water drops was observed.
Δ: Several marks of water drops were observed several hours later.
X: An enormous number of marks of water drops were observed on the entire adhered surfaces.

2. Adhesion property

The test specimen subjected to the test of moisture staying property was peeled by fixing the portion a shown in FIG. 1 with one hand and the portions b and c with another hand and pulling in the vertical direction. The evaluation was made according to the following criteria.

◯: The specimen cannot be peeled.
Δ: The specimen cannot be peeled, but can be peeled if scored by a cutter along the adhesive layer.
X: The specimen can be easily peeled by hand.

(Corrosion resistance of information recording layer)

The adhesive was applied to each deposition film of a polycarbonate substrate having an Al deposition film and a polycarbonate substrate having an SiC deposition film, and a test specimen as shown in FIG. 1 was prepared in the same manner as above. Using a polycarbonate substrate having an Al deposition film and a polycarbonate substrate having an Si deposition film, a test specimen was also prepared in the same manner. The prepared test specimens were allowed to stand in a thermo-hygrostat at 80° C. and a humidity of 95% for 168 hours, and the state of each deposition film was observed. The evaluation was made according to the following criteria.

○: There is no change in hue of the surface and there is no pinhole in each deposition film.
Δ: There is no pinhole, but there is a change in hue of the surface.
X: Change in hue of the surface and pinholes are observed in the deposition film.

Abbreviations of respective components shown in Tables 1 and 2 are as follows:

Component (A)
N-VP: N-vinylpyrrolidone
Component (B)
KRM7595: Urethane acrylate oligomer prepared using a caprolactone-based polyol as a raw material, trade mark KRM7595 (made by DAICEL-UCB COMPANY LTD.)
Component (C)
D1173: 2-Hydroxy-2-methyl-1-phenyl ketone, trade mark Dalocure 1173 (made by Ciba Specialty Chemicals K.K. Japan) (C-1 component)
IC184: 1-Hydroxycyclohexyl phenyl ketone, trade mark Irgacure 184 (made by Ciba Specialty Chemicals K.K. Japan) (C-1 component)
IC907: 2-Methyl-1-[4-(methylthio)phenyl]-2-morpholino-propane-1-one (made by Ciba Specialty Chemicals Co., Ltd.) (C-2 component)
L-TPO: 2,4,6-Trimethylbenzoyldiphenylphosphine oxide, trade mark Lucitin-TPO (made by BASF Japan Ltd.) (C-2 component)
Component (D)
THF-A: Tetrahydrofurfuryl acrylate
Component (E)
EB150: Diacrylate prepared using bisphenol as a raw material, trade mark EBECRYL 150 (made by DAICEL-UCB COMPANY LTD.) (E-1 component)
EB3700: Diacrylate prepared using a bisphenol type epoxy resin as a raw material, trade mark EBECRYL 3700 (made by DAICEL-UCB COMPANY LTD.) (E-2 component)
Other components
AC-M: Morpholine acrylate
EB270: Urethane acrylate oligomer prepared using a polyether polyol as a raw material, trade mark EBECRYL 270 (made by DAICEL-UCB COMPANY LTD.)
PhEA: Phenoxyethyl acrylate

TABLE 1

| Example No. | 1 | 2 | 3 | 4 | 5 | 6 | 7 |
|---|---|---|---|---|---|---|---|
| Composition (part) | | | | | | | |
| N-VP (A) | 50 | 50 | 25 | 25 | 35 | 10 | 10 |
| KRM7595 (B) | 50 | 50 | 50 | 50 | 50 | 40 | 40 |
| D1173 (C-1) | 5 | — | — | — | — | — | — |
| IC184 (C-1) | — | 5 | 5 | 5 | 5 | 5 | 5 |
| IC907 (C-2) | — | — | — | — | — | — | 1 |
| THF-A (D) | — | — | 25 | — | — | 30 | 30 |
| EB150 (E-1) | — | — | — | 25 | — | 20 | 20 |
| EB3700 (E-2) | — | — | — | — | 15 | — | — |
| Evaluation results | | | | | | | |
| Water resistance | | | | | | | |
| 1. Moisture staying property | ○ | ○ | ○ | ○ | ○ | ○ | ○ |
| 2. Adhesion property | ○ | ○ | ○ | ○ | ○ | ○ | ○ |
| Corrosion resistance of Information recording layer | | | | | | | |
| 1. SiC/Al disk | ○ | ○ | ○ | ○ | ○ | ○ | ○ |
| 2. Si/Al disk | ○ | ○ | ○ | ○ | ○ | ○ | ○ |

TABLE 2

| Comparative Example No. | 1 | 2 | 3 | 4 | 5 | 6 | 7 |
|---|---|---|---|---|---|---|---|
| Composition (part) | | | | | | | |
| N-VP (A) | 50 | 50 | — | — | — | 10 | — |
| AC-M | — | — | 10 | — | — | — | 20 |
| KRM7595 (B) | — | 50 | 40 | 50 | — | — | — |
| EB270 | 50 | — | — | — | 50 | 40 | 30 |
| L-TPO (C-2) | — | 5 | — | — | 5 | — | — |
| IC184 (C-1) | 5 | — | 5 | 5 | — | 5 | 5 |
| THF-A (D) | — | — | 30 | — | — | 30 | 30 |
| EB150 (E-1) | — | — | 20 | — | — | 20 | 20 |
| PhEA | — | — | — | 50 | 50 | — | — |
| Evaluation results | | | | | | | |
| Water resistance | | | | | | | |
| 1. Moisture staying property | X | ○ | Δ | X | X | X | X |
| 2. Adhesion property | X | X | X | ○ | X | ○ | X |
| Corrosion resistance of Information recording layer | | | | | | | |
| 1. SiC/Al disk | Δ | X | ○ | Δ | X | Δ | Δ |
| 2. Si/Al disk | Δ | X | X | Δ | X | Δ | Δ |

INDUSTRIAL APPLICABILITY

Optical disks laminated using the ultraviolet curable adhesive of the present invention exhibit an excellent moisture resistance without any adverse influence of moisture on the information recording layer thereof. In particular, an excellent moisture resistance is exhibited by the use of the ultraviolet curable adhesive of the present invention even in the case that the optical disks have a thick translucent film (information recording layer).

I claim:
1. An ultraviolet-curable adhesive for bonding optical disks, which comprises:
   (A) N-vinylpyrrolidone,
   (B) a urethane (meth)aerylate oligomer derived from a caprolactone-based polyol, an alicyclic diisocyanate and (meth)acrylic acid, and
   (C) a photopolymerization initiator containing (C-1) a photopolymerization initiator composed of only carbon atoms, hydrogen atoms and oxygen atoms without containing a nitrogen atom, a sulfur atom and a phosphorus atom and (C-2) a photopolymerization initiator containing a nitrogen atom and/or a sulfur atom in a (C-1)/(C-2) ratio of 70/30 to 100/0 by weight, wherein said ultraviolet-curable adhesive bonds optical disks.
2. The adhesive of claim 1, wherein only the component (C-1) is used as said photopolymerization initiator (C).
3. The adhesive of claim 1, wherein the content of the component (A) is from 5 to 60% by weight based on the total amount of the components (A) and (B).
4. The adhesive of claim 2, wherein the content of the component (A) is from 5 to 60% by weight based on the total amount of the components (A) and (B).
5. The adhesive of claim 1, 2 or 3, which further contains (D) 5 to 100 parts by weight of an alicyclic mono(meth)acrylate per 100 parts by weight of the total of the components (A) and (B).
6. The adhesive of claim 1, 2 or 3, which further contains (E) 5 to 95 parts by weight of a bisphenol type di(meth)acrylate per 100 parts by weight of the total of the components (A) and (B), provided that the amount of the component (E) does not exceed the amount of the component (B).
7. The adhesive of claim 1, 2 or 3, which further contains (D) 5 to 100 parts by weight of an alicyclic mono(meth)

acrylate and (E) 5 to 95 parts by weight of a bisphenol type di(meth)acrylate per 100 parts by weight of the total of the components (A) and (B), provided that the amount of the component (E) does not exceed the amount of the component (B).

8. The adhesive of claim 1, wherein said photopolymerization initiator (C) contains said initiator (C-1) and said initiator (C-2) in a (C-1)/(C-2) ratio of 70/30 to 99/1 by weight.

9. The adhesive of claim 8, wherein said initiator (C-1) is at least one member selected from the group consisting of 1-hydroxy-cyclohexyl phenyl ketone, 2-hydroxy-2-methyl-1-phenylpropanone, 2,2-dimethoxy-2-phenylacetophenone, benzophenone, benzoin isobutyl ether, benzoin n-butyl ether, 2,2-dimethoxy-1,2-diphenylethane-1-one, methylphenyl glyoxylate and benzyl dimethyl ketal, and said initiator (C-2) is at least one member selected from the group consisting of Michler's ketone, 2,4-diethylthioxanthone, 2,4-diisopropylthioxanthone, 2-isopropylthioxanthone, 2-chloro-thioxanthone, 2-benzyl-2-dimethylamino-1-(4-morpholinophenyl)-butanone-1,3,6-bis(2-methyl-2-morpholinopropanonyl)-9-butyl-carbazole, isoacryl-4-(dimethylamino)benzoate, ethyl-4-(dimethylamino)benzoate, (4-(4-methylphenylthio)phenyl)-phenylmethanone and 2-methyl-1-(4-(methyl-thio)phenyl)-2-morpholino-propane-1-one.

10. An ultraviolet-curable adhesive for bonding optical disks, which comprises:
 (A) N-vinylpyrrolidone,
 (B) a urethane (meth)acrylate oligomer derived from a caprolactone-based polyol, an alicyclic diisocyanate and (meth)acrylic acid, and
 (C) aphotopolymerization initiator containing (C-1) a photopolymerization initiator composed of only carbon atoms hydrogen atoms and oxygen atoms without containing a nitrogen atom, a sulfur atom and a phosphorus atom and (C-2) a photopolymerization initiator containing a nitrogen atom and/or a sulfur atom in a (C-1)/(C-2) ratio of 70/30 to 99/1 by weight.

11. The adhesive of claim 10, wherein the content of the component (A) is from 5 to 60% by weight based on the total amount of the components (A) and (B).

12. The adhesive of claim 10, which further contains (D) 5 to 100 parts by weight of an alicyclic mono(meth)acrylate per 100 parts by weight of the total of the components (A) and (B).

13. The adhesive of claim 10, which further contains (E) 5 to 95 parts by weight of a bisphenol type di(meth)acrylate per 100 parts by weight of the total of the components (A) and (B), provided that the amount of the component (E) does not exceed the amount of the component (B).

14. An ultraviolet-curable adhesive for bonding optical disks, which comprises:
 (A) N-vinylpyrrolidone, the amount of which is from 5 to 60% by weight based on the total amount of the components (A) and (B),
 (B) a urethane (meth)acrylate oligomer derived from a caprolactone-based polyol, an alicyclic diisocyanate and (meth)acrylic acid,
 (C) a photopolymerization initiator containing (C-1) a photopolymerization initiator composed of only carbon atoms, hydrogen atoms and oxygen atoms without containing a nitrogen atom, a sulfur atom and a phosphorus atom and (C-2) a photopolymerization initiator containing a nitrogen atom and/or a sulfur atom in a (C-1)/(C-2) ratio of 70/30 to 100/0 by weight,
 (D) 5 to 100 parts by weight of an alicyclic mono(meth)acrylate per 100 parts by weight of the total of the components (A) and (B), and
 (E) 5 to 95 parts by weight of a bisphenol type di(meth)acrylate per 100 parts by weight of the total of the components (A) and (B), provided that the amount of the component (E) does not exceed the amount of the component (B).

15. The adhesive of claim 14, wherein said photopolymerization initiator (C) contains said initiator (C-1) and said initiator (C-2) in a (C-1)/(C-2) ratio of 70/30 to 99/1 by weight.

* * * * *